United States Patent
Sasaki et al.

(10) Patent No.: US 10,830,886 B2
(45) Date of Patent: Nov. 10, 2020

(54) ROUTE SEARCH SYSTEM AND NON-TRANSITORY COMPUTER READABLE MEDIUM THAT STORES ROUTE SEARCH PROGRAM

(71) Applicant: TOYOTA JIDOSHA KABUSHIKI KAISHA, Toyota (JP)

(72) Inventors: Kenji Sasaki, Okazaki (JP); Yuji Sato, Owariasahi (JP); Xin Jin, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 119 days.

(21) Appl. No.: 15/689,176

(22) Filed: Aug. 29, 2017

(65) Prior Publication Data

US 2018/0059241 A1     Mar. 1, 2018

(30) Foreign Application Priority Data

Sep. 1, 2016    (JP) ................. 2016-170659

(51) Int. Cl.
| | | |
|---|---|---|
| *G01S 13/95* | (2006.01) | |
| *H04W 4/021* | (2018.01) | |
| *G01S 13/931* | (2020.01) | |

(52) U.S. Cl.
CPC .......... *G01S 13/951* (2013.01); *H04W 4/022* (2013.01); *G01S 2013/9322* (2020.01)

(58) Field of Classification Search
CPC combination set(s) only.
See application file for complete search history.

(56) References Cited

U.S. PATENT DOCUMENTS

| | | | | |
|---|---|---|---|---|
| 6,356,839 | B1* | 3/2002 | Monde | G01C 21/3492 340/995.23 |
| 2009/0281717 | A1 | 11/2009 | Nambata | |
| 2011/0035144 | A1 | 2/2011 | Okamoto et al. | |
| 2012/0046822 | A1* | 2/2012 | Anderson | G01C 21/3492 701/29.1 |

(Continued)

FOREIGN PATENT DOCUMENTS

| | | |
|---|---|---|
| JP | 2006228020 A | 8/2006 |
| JP | 2007-047034 A | 2/2007 |

(Continued)

*Primary Examiner* — Hussein Elchanti
(74) *Attorney, Agent, or Firm* — Hunton Andrews Kurth LLP (57) ABSTRACT

A route search system includes an electronic control unit configured to perform: acquiring estimated weather information, the estimated weather information being information about weather that is estimated in a region where a candidate of a first route from a departure place to a destination place exists; acquiring experienced weather information, the experienced weather information being information about weather that a user has experienced in past; an searching the first route by preferentially selecting a first road over a second road, and outputting information about the first route, the first road being a road in a first region where the estimated weather information coincides with the experienced weather information, the second road being a road in a second region where the estimated weather information does not coincide with the experienced weather information.

9 Claims, 3 Drawing Sheets

(56) References Cited

U.S. PATENT DOCUMENTS

| | | | |
|---|---|---|---|
| 2013/0346043 A1* | 12/2013 | Mewes | G06F 17/5009 |
| | | | 703/2 |
| 2014/0074402 A1* | 3/2014 | Hassib | G01C 21/3461 |
| | | | 701/533 |
| 2014/0278331 A1* | 9/2014 | Mewes | G06F 17/5009 |
| | | | 703/17 |
| 2016/0009218 A1* | 1/2016 | Nakashima | B60Q 1/20 |
| | | | 701/36 |
| 2016/0011001 A1* | 1/2016 | Emory | G01C 21/3492 |
| | | | 701/465 |
| 2018/0050698 A1* | 2/2018 | Polisson | B60W 30/182 |

FOREIGN PATENT DOCUMENTS

| | | |
|---|---|---|
| JP | 2009257832 A | 11/2009 |
| JP | 2016085080 A | 5/2016 |
| WO | 2007/142066 A1 | 12/2007 |

* cited by examiner

ROUTE SEARCH SYSTEM AND NON-TRANSITORY COMPUTER READABLE MEDIUM THAT STORES ROUTE SEARCH PROGRAM

INCORPORATION BY REFERENCE

The disclosure of Japanese Patent Application No. 2016-170659 filed on Sep. 1, 2016 including the specification, drawings and abstract is incorporated herein by reference in its entirety.

BACKGROUND

1. Technical Field

The disclosure relates to a route search system and a non-transitory computer readable medium that stores a route search program.

2. Description of Related Art

There is a known technology of changing a proposed route depending on weather condition. For example, Japanese Patent Application Publication No. 2007-47034 discloses a technology of detecting a spot where a rainfall or snow depth is greater than a reference value, as a safety decrease spot, and searching a route that detours around the safety decrease spot.

SUMMARY

In the above-described related art, the route sometimes detours around a region even though a user does not wish to detour around the region. That is, in the case where the weather is bad beyond user's experience, the detour is often appropriate because many users do not want to move under such weather. Meanwhile, even when the weather is equally bad, users who are accustomed to such weather through experience do not care about such weather, and therefore, the detour is often inappropriate. Therefore, when the weather is evaluated for all regions based on an identical reference value and the detour is performed, the user sometimes gets a feeling that the detour is unnecessary, depending on user's experience. Furthermore, in the related art, because of the detour around the spot where rainfall or the like is greater than the reference value, even when the distance of the route with the detour is extremely long, the detour route is searched, and therefore, the user is sometimes inconvenienced. Furthermore, in the related art, even when the spot where rainfall or the like exceeds the reference value is very small, the detour route is searched, and therefore, the user sometimes gets a feeling that the detour is a needless detour. The disclosure provides a technology for reducing the possibility of detouring around a region even though the user does not wish to detour around the region.

A route search system according to a first aspect of the disclosure includes an electronic control unit configured to perform: acquiring estimated weather information, the estimated weather information being information about weather that is estimated in a region where a candidate of a first route from a departure place to a destination place exists; acquiring experienced weather information, the experienced weather information being information about weather that a user has experienced in past; and searching the first route by preferentially selecting a first road over a second road, and outputting information about the first route, the first road being a road in a first region where the estimated weather information coincides with the experienced weather information, the second road being a road in a second region where the estimated weather information does not coincide with the experienced weather information.

For achieving the object, a route search program causes a computer to function as: an estimated weather acquisition unit that acquires estimated weather, the estimated weather being weather that is estimated in a region where a candidate of a route from a departure place to a destination place exists; an experienced weather acquisition unit that acquires experienced weather based on a movement history of a user, the experienced weather being weather that the user has experienced in past; and a route search unit that searches the route by preferentially selecting a road in the region where the estimated weather coincides with the experienced weather over a road in the region where the estimated weather does not coincide with the experienced weather.

A route search system according to a third aspect of the disclosure includes: an estimated weather acquisition unit that acquires estimated weather, the estimated weather being weather that is estimated in a region where a candidate of a route from a departure place to a destination place exists; an experienced weather acquisition unit that acquires experienced weather based on a movement history of a user, the experienced weather being weather that the user has experienced in past; and a route search unit that searches the route by preferentially selecting a road in the region where the estimated weather coincides with the experienced weather over a road in the region where the estimated weather does not coincide with the experienced weather.

A route search system according to a fourth aspect of the disclosure includes an electronic control unit configured to perform: acquiring estimated weather information, the estimated weather information being information about weather that is estimated in a region where a candidate of a first route from a departure place to a destination place exists; acquiring experienced weather information, the experienced weather information being information about weather that a user has experienced in past; and searching the first route by preferentially selecting a first road over a second road, and outputting information about the first route, the first road being a road in a first region where the estimated weather information includes the experienced weather information, the second road being a road in a second region where the estimated weather information does not includes the experienced weather information.

As described above, in the route search system and a non-transitory computer readable medium that stores the route search program, the route is searched by preferentially selecting the road in the region where the estimated weather coincides with the experienced weather over the road in the region where the estimated weather does not coincide with the experienced weather. That is, there is a high possibility that the region under the weather that the user has experienced in the past is not a region that the user wishes to avoid even by a detour. Hence, the road in the region where the estimated weather coincides with the experienced weather is preferentially selected over the road in the region where the estimated weather does not coincide with the experienced weather. Thereby, it is possible to reduce the possibility of detouring around a region even though the user does not wish to detour around the region.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Herein, embodiments of the disclosure will be described in the following order: (1) Configuration of Route Search System, (2) Route Search Process and (3) Other Embodiments.

Figure 1:
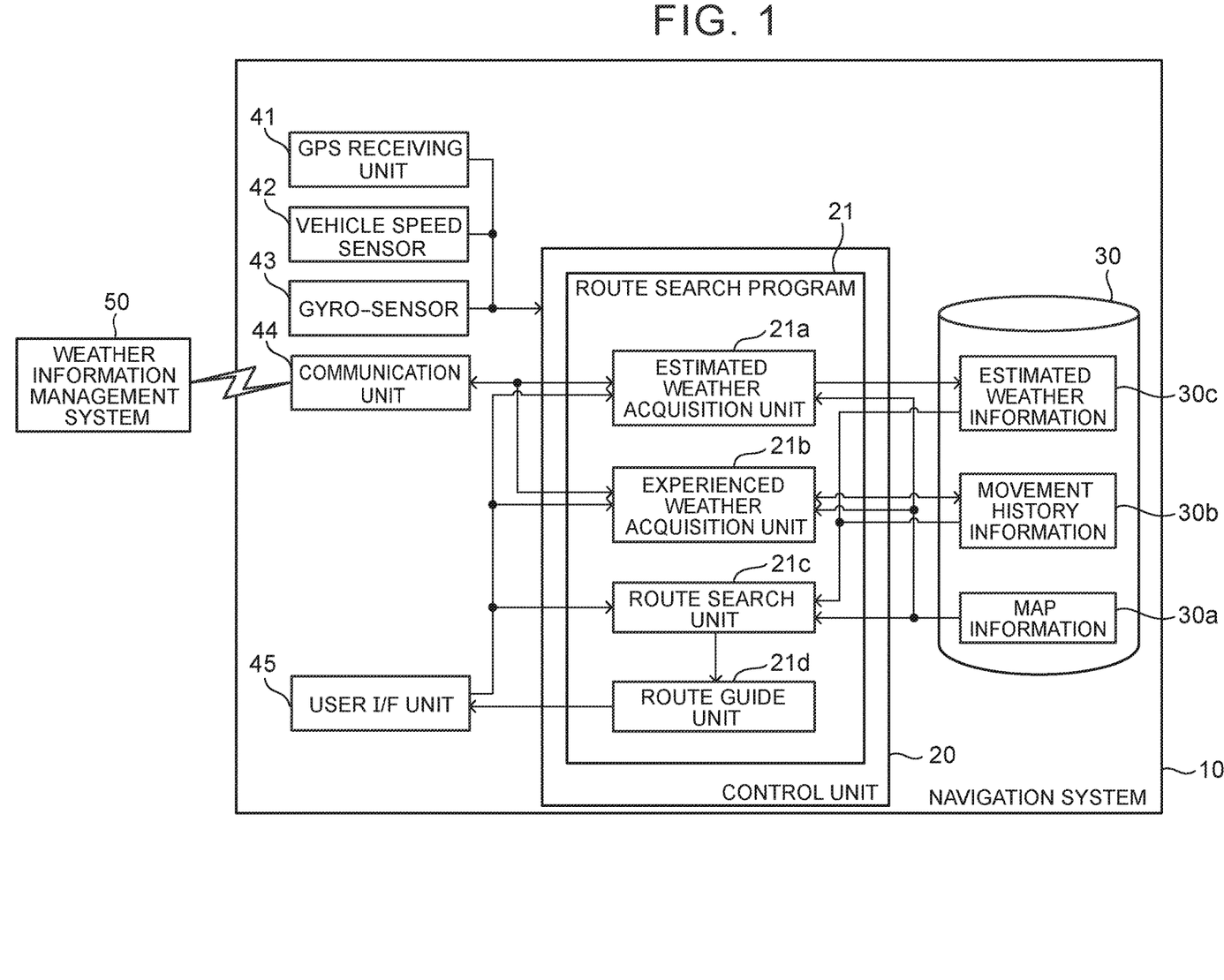
FIG. 1 is a block diagram showing the configuration of a route search system.

(1) Configuration of Route Search System: FIG. 1 is a block diagram showing the configuration of a navigation system 10 to function as a route search system that is an embodiment of the disclosure. The navigation system 10 includes a control unit 20 that includes a CPU, a RAM, a ROM and the like, and the control unit 20 can execute various programs that are recorded in the ROM or a recording medium 30. In the embodiment, the control unit 20 can execute a route search program 21 as one of the programs.

The control unit 20 can search a route for the arrival at a destination place from a current place as a departure place, by a process of the route search program 21. Further, the control unit 20 can execute a guide for leading a vehicle including the navigation system 10, along the route, by a process of the route search program 21.

In the recording medium 30, map information 30a is previously recorded. The map information 30a includes shape interpolation point data indicating positions of nodes corresponding to end points of road sections, and the positions of shape interpolation points for specifying shapes of roads among nodes, link data indicating links among nodes, facility data indicating positions and attributes of facilities, and the like. In the embodiment, the link data is associated with information indicating regions to which the road sections indicated in the link data belong. In the embodiment, weather information is defined for each region. Further, the link data is associated with information indicating a default value of a cost for each road section specified by the distance of the road section and the like. Further, in the operation stage of the navigation system 10, estimated weather information 30c and movement history information 30b are recorded in the recording medium 30.

The navigation system 10 includes a GPS receiving unit 41, a vehicle speed sensor 42, a gyro-sensor 43, a communication unit 44, and a user I/F unit 45. The user I/F unit 45 is an interface unit for inputting an instruction of the user and providing a variety of information to the user, and includes a touch-panel display and an output unit for output sound of a speaker or the like, which are not illustrated.

The GPS receiving unit 41 receives electric waves from GPS satellites, and outputs a signal for calculating the current place of the vehicle through an unillustrated interface. The vehicle speed sensor 42 outputs a signal corresponding to the rotational speed of wheels included in the vehicle. The control unit 20 acquires the signal through an unillustrated interface, to acquire the vehicle speed. The gyro-sensor 43 detects the angular acceleration in the turning of the vehicle on a horizontal plane, and outputs a signal corresponding to the orientation of the vehicle. The control unit 20 acquires the signal, to acquire the travelling direction of the vehicle. The control unit 20 acquires the current place of the vehicle, by specifying the running path of the vehicle based on output signals of the vehicle speed sensor 42, the gyro-sensor 43 and the like. The output signal of the GPS receiving unit 41 is used, for example, for the correction of the vehicle current place that is specified by the vehicle speed sensor 42, the gyro-sensor 43 and the like.

The communication unit 44 includes a circuit for wirelessly communicating with a weather information management system 50 that exists in the exterior, and through the communication unit 44, the control unit 20 can acquire weather information indicating the current weather in an arbitrary region, from the weather information management system 50. In the embodiment, the weather information is defined for each region. The division into the regions is previously performed, and for example, a region division such as an administrative division can be employed. The weather information management system 50 acquires the weather information indicating the current weather, and sends the weather information as the estimated weather, but a forecast of future weather in each region may be acquired as the weather information.

By the route search program 21 in the embodiment, the control unit 20 realizes a function to search the route from the current place to the destination place based on the weather in a region where a candidate of the route exists and the weather experienced by the user. For executing the route search, the route search program 21 includes an estimated weather acquisition unit 21a, an experienced weather acquisition unit 21b, a route search unit 21c and a route guide unit 21d.

The estimated weather acquisition unit 21a is a program module by which the control unit 20 realizes a function to acquire the estimated weather that is estimated as the weather in the region where the candidate of the route from the departure place to the destination place exists. In the embodiment, the user can input the destination place by operating the user I/F unit 45. After the destination place is input, the control unit 20 acquires the current place of the vehicle, based on the output signals of the GPS receiving unit 41, the vehicle speed sensor 42 and the gyro-sensor 43. Then, the control unit 20 regards the current place as the departure place, and acquires a region that contains the departure place and the destination place, a region that contains roads between the departure place and the destination place, and a region that is within a predetermined distance from each region, as the region where the candidate of the route exists, by referring to the map information 30a. Other than this technique, various techniques can be employed, as the technique of the acquisition of the region where the candidate of the route exists.

After the acquisition of the region where the candidate of the route exists, the control unit 20 outputs a sending request for the estimated weather in the region, to the weather information management system 50 through the communication unit 44. After the weather information management system 50 acquires the sending request, the weather information management system 50 specifies the region indicated by the sending request, and acquires the estimated weather indicating the current weather in the region. Then, the weather information management system 50 sends the estimated weather to the navigation system 10 through an unillustrated communication unit.

After the estimated weather is sent, the control unit 20 acquires the estimated weather through the communication unit 44, and records the estimated weather in the recording medium 30, as the estimated weather information 30c. As a result, the estimated weather, which is the current weather in the region where the candidate of the route exists, is specified. The estimated weather and later-described experienced weather may be defined by various techniques, and in the embodiment, are defined by the condition of the weather. That is, ranges corresponding to conditions of the weather are defined with respect to the value of rainfall, snowfall, wind, temperature, humidity or the like. The weather information management system 50 defines the condition of the weather depending on which range includes the value of rainfall or the like. For example, the weather information management system 50 defines the condition of the weather as heavy rain in the case where the rainfall amount exceeds a first reference value, defines the condition of the weather as rain in the case where the rainfall amount is in a range from the first reference value to a second reference value, and defines the condition of the weather as light rain in the case where the rainfall amount is equal to or smaller than the second reference value.

The experienced weather acquisition unit 21b is a program module by which the control unit 20 realizes a function to acquire the experienced weather, which is the weather that the user has experienced in the past, based on the movement history of the user. In the embodiment, in the operation stage of the navigation system 10, the control unit 20 specifies the history of the current place indicated by the output signals of the GPS receiving unit 41, the vehicle speed sensor 42 and the gyro-sensor 43. Further, the control unit 20 causes the weather information management system 50 to send the current weather at the current place through the communication unit 44, and associates the sent weather with the current place. The thus generated movement history (movement history information 30b) associated with the weather information is recorded in the recording medium 30 in accordance with a predetermined trigger (a trigger at a regular interval, a trigger caused by the arrival at the destination place, or the like).

By a process of the experienced weather acquisition unit 21b, the control unit 20 can acquire the experienced weather at an arbitrary timing by referring to the movement history information 30b. In the embodiment, the control unit 20 refers to the movement history information 30b, and in the case where the number of times by which the user has experienced the same weather is equal to or larger than a predetermined number of times, the control unit 20 acquires the weather as the experienced weather.

The route search unit 21c is a program module by which the control unit 20 realizes a function to search the route by preferentially selecting a road in the region where the estimated weather coincides with the experienced weather over a road in the region where the estimated weather does not coincide with the experienced weather. That is, in the case where the user has not experienced a certain kind of weather in the past, there is a high possibility that the user wishes to avoid the movement under the certain kind of weather. In the case where the user has experienced the certain kind of weather, the user may not wish to avoid the movement under the certain kind of weather.

Hence, by acquiring the experienced weather, which is the weather that the user has experienced in the past, it is possible to define an index for estimating the weather that the user wishes to avoid. Then, the road in the region where the estimated weather in the region where the candidate of the route from the departure place to the destination place exists coincides with the experienced weather is preferentially selected over the road in the region where the estimated weather does not coincide with the experienced weather. Thereby, it is possible to configure the route, so as not to exclude a road under the weather that the user has experienced in the past and that does not need to be avoided by a detour, from the route. As a result, it is possible to reduce the possibility of detouring around a region even though the user does not wish to detour around the region.

For such a route search based on the weather, the control unit 20 refers to the map information 30a, and searches the route from the departure place to the destination place. In the embodiment, since the cost for each road section is recorded in the map information 30a, the control unit 20 searches a route that minimizes the sum of the costs. Here, in the embodiment, the control unit 20 searches the route, by correcting the default value of the cost depending on the weather in regions where roads constituting the route can exist and thereby adjusting, for each road section, the priority when the route is selected.

At this time, the control unit 20 increases the priority when the road in the region under the experienced weather is selected as the route, as the amount of experience of the user for the experienced weather becomes larger. That is, it is presumable that the user is more accustomed to the movement under the experienced weather as the amount of experience of the user for the experienced weather becomes larger. Hence, the control unit 20 increases the priority when the road in the region under the experienced weather is selected as the route, as the amount of experience for the experienced weather becomes larger, and thereby, adjusts the cost such that the road under the weather to which the user is accustomed is likely to be selected.

Specifically, the control unit 20 refers to the movement history information 30b, and specifies the number of times by which the user has experienced. The number of times is regarded as the amount of experience, and the control unit 20 compares the number of times to a previously decided threshold, and thereby evaluates the amount of experience in a stepwise manner. Then, the control unit 20 decreases the correction factor 1) of the cost for the experienced weather, as the amount of experience becomes larger.

For example, when the amount of experience is divided into three levels: no-experience, small experience amount and large experience amount, the control unit 20 sets the correction factor of the cost to C1 in the case where it is determined that the amount of experience for a certain kind of experienced weather is the large experience amount. In the case where it is determined that the amount of experience for the certain kind of experienced weather is the small experience amount, the control unit 20 sets the correction factor of the cost to C2. In the case where it is determined that the amount of experience for the certain kind of experienced weather is the no-experience amount, the control unit 20 sets the correction factor of the cost to 1 (that is, the correction is not performed).

The correction factor of the cost is a factor by which the default value of the cost is multiplied, and C1<C2<1 holds. In the embodiment, the route that minimizes the sum of the costs is searched, and therefore, when the default value of the cost is multiplied by the correction factor, the road section is likely to be selected as the route, compared to road sections with no correction. Further, the correction factor has a magnitude relation of C1<C2, and therefore, in the case of a large amount of experience, the priority is increased compared to in the case of a small amount of experience.

According to the above configuration, since it is presumable that the user is more accustomed to the movement under the experienced weather as the amount of experience of the user for the experienced weather becomes larger, the road in the region under the estimated weather that coincides with the experienced weather is likely to be selected as the route. According to the above configuration, the road in the region under the weather to which the user is accustomed is likely to be selected.

The route guide unit 21d is a program module by which the control unit 20 realizes a function to perform the guide about the route. That is, the control unit 20 specifies the current place of the vehicle based on the output signals of the GPS receiving unit 41, the vehicle speed sensor 42 and the gyro-sensor 43. Further, the control unit 20 refers to the map information 30a, and specifies a movement direction of the vehicle and an operation (right turn or left turn, for example) in front of the current place that are necessary for moving the current place along the route. Then, the control unit 20 outputs a control signal to the user I/F unit 45 to perform the guide about the movement direction and the operation, and thereby, leads the user such that the current place moves on the route. The above configuration increases the possibility that the user can arrive at the destination place through the road in the region under the weather to which the user is accustomed.

Figure 2:
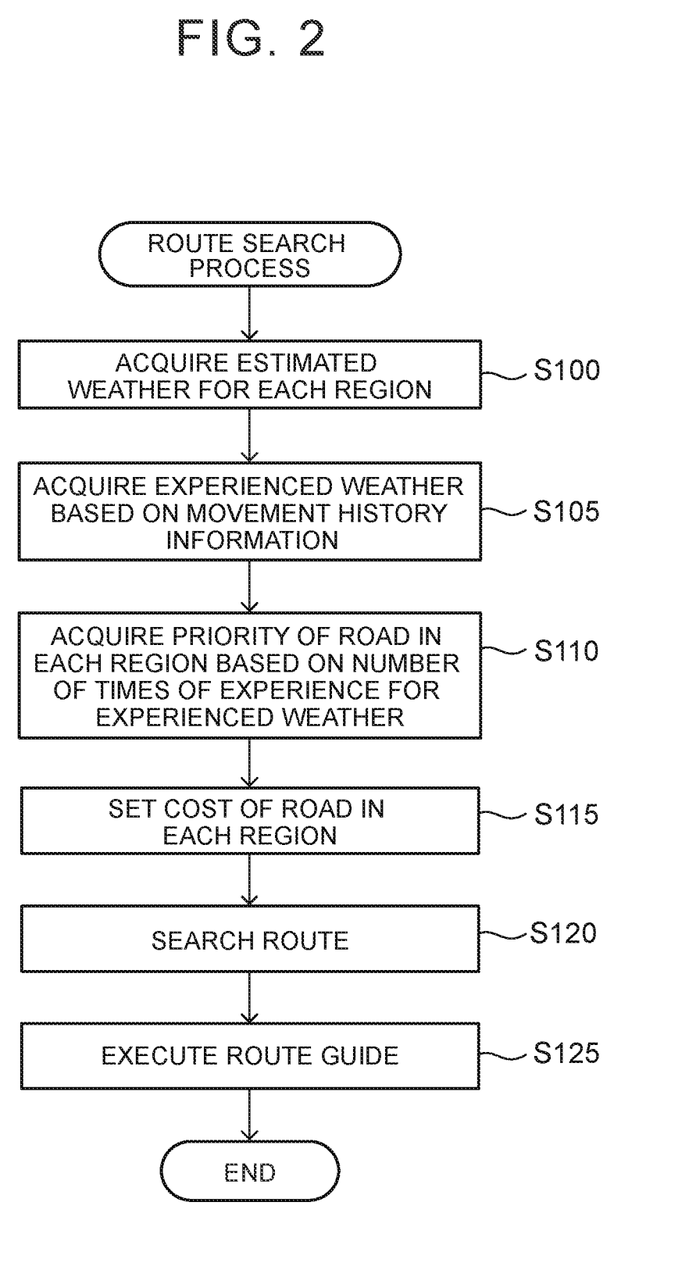
FIG. 2 is a flowchart showing a route search process.

(2) Route Search Process: Next, a route search process will be described in detail. FIG. 2 is a flowchart of the route search process. The route search process is executed, for example, when the user gives an instruction of the start of the route guide and inputs the destination place through the user I/F unit 45. In the route search process, the control unit 20 acquires the estimated weather for each region, by the process of the estimated weather acquisition unit 21a (step S100). That is, the control unit 20 acquires the current place of the vehicle based on the output signals of the GPS receiving unit 41, the vehicle speed sensor 42 and the gyro-sensor 43. Further, the control unit 20 acquires the destination place input by the user.

Furthermore, the control unit 20 refers to the map information 30a, and acquires the region that contains the departure place and the destination place, the region that contains roads between the departure place and the destination place, and the region that is within a predetermined distance from each region, as the region where the candidate of the route exists. Then, the control unit 20 outputs the sending request for the estimated weather in the region, to the weather information management system 50 through the communication unit 44. As a result, the weather information management system 50 sends back the estimated weather in the region, and therefore, the control unit 20 receives the estimated weather through the communication unit 44, and records the estimated weather in the recording medium 30, as the estimated weather information 30c.

Figure 3A:
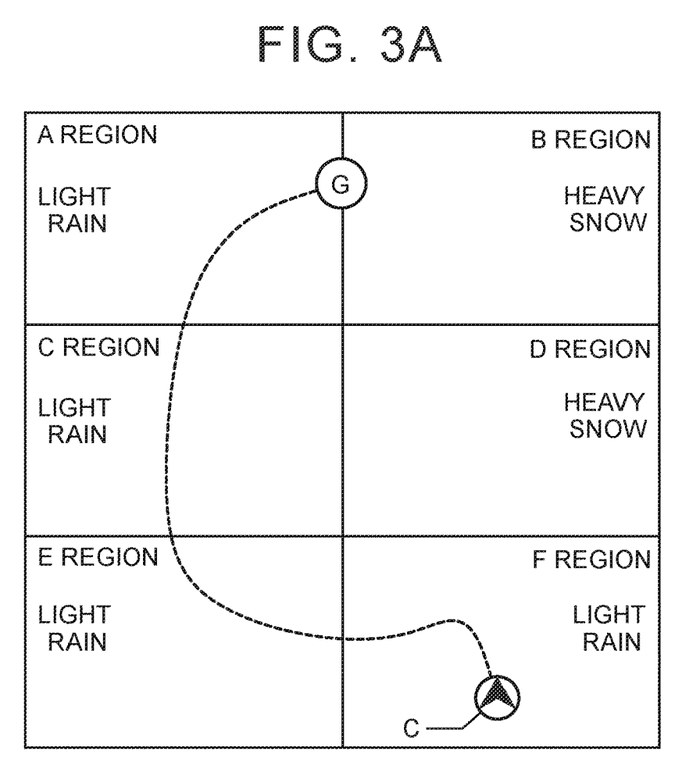
FIG. 3A is a diagram for describing a route search example.

FIG. 3A is a diagram for describing an example in which an A region, a B region, a C region, a D region, an E region and an F region are regions where candidates of the route exist. In FIG. 3A, rectangular regions schematically show the A region, the B region, the C region, the D region, the E region and the F region, respectively, and in each rectangle, the estimated weather is shown. That is, in the example, the estimated weather in the A region, the C region, the E region and the F region is a light rain, and the estimated weather in the B region and the D region is a heavy snow.

Next, the control unit 20 acquires the experienced weather based on the movement history information 30b, by the process of the experienced weather acquisition unit 21b (step S105). That is, the control unit 20 refers to the movement history information 30b, and in the case where the number of times by which the user has experienced the same weather is equal to or larger than the predetermined number of times, the control unit 20 acquires the weather as the experienced weather.

Next, the control unit 20 acquires the priority of the road in each region based on the number of times of experience for the experienced weather, by the process of the route search unit 21c (step S110). That is, the control unit 20 determines whether the estimated weather coincides with the experienced weather, for each region where the candidate of the route exists. The control unit 20 sets the correction factor of the cost to 1, for a region where the estimated weather does not coincide with the experienced weather. In the case where there is a region where the estimated weather coincides with the experienced weather, the control unit 20 refers to the movement history information 30b, specifies the number of times of experience for the experienced weather, and specifies the amount of experience for the experienced weather based on the number of times of experience. Then, the control unit 20 specifies the correction factor of the cost based on the amount of experience.

In the example shown in FIG. 3A, in the case where the amount of experience for the light rain is the small experience amount and the amount of experience for the heavy snow is the large experience amount, the control unit 20 sets the correction factors of the costs of the roads in the A region, the C region, the E region and the F region, to C2, and sets the correction factors of the costs of the roads in the B region and the D region, to C1. Here, the correction factor is multiplied by the cost, and as the value becomes smaller, the cost is decreased and the road is more likely to be selected. Therefore, when each of the correction factors of C1, C2 and 1 is decided, the priority in the road selection for each region can be regarded as being set to "High", "Middle" or "Low".

Next, the control unit 20 sets the cost of the road in each region, by the process of the route search unit 21c (step S115). That is, the control unit 20 multiplies the default value of the cost of the road section in each region by the correction factor of the cost acquired in step S110, for each region where the candidate of the route exists. The cost after the correction is referred to, at the time of the route search.

After the cost is set, the control unit 20 searches the route, by the process of the route search unit 21c (step S120). That is, the control unit 20 searches the route such that the sum of the costs of the road sections constituting the route from the departure place to the destination place is minimized, for example, using an algorithm such as the Dijkstra's algorithm.

Figure 3B:
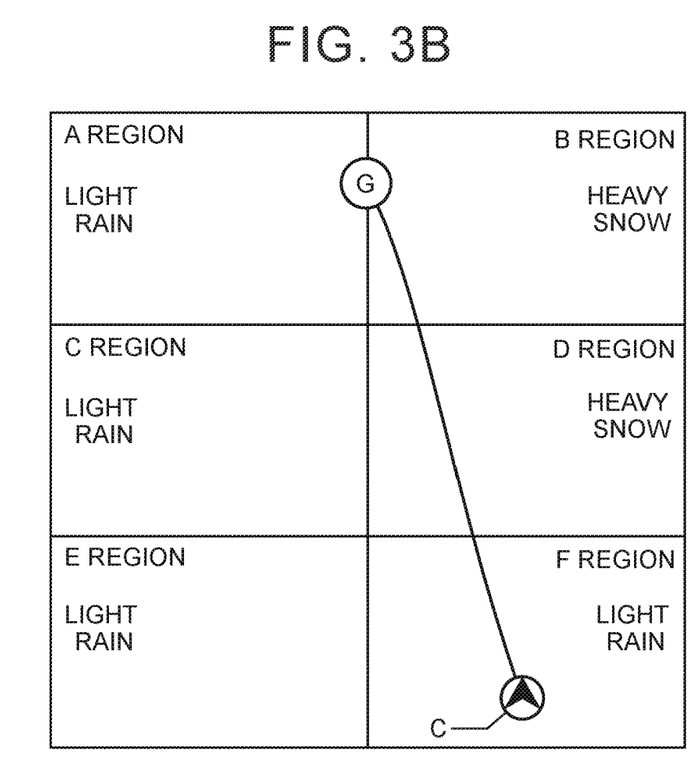
FIG. 3B is a diagram for describing a route search example.

FIG. 3B is a diagram schematically showing a route that is acquired in the example shown in FIG. 3A. In FIG. 3B, a current place C of the vehicle exists in the F region, and a destination place G exists on the border between the A region and the B region. In the example, in the case of performing the detour around roads with snowfall amounts equal to or larger than the reference value as in the case of the related art, a detour route shown by a broken line in FIG. 3A can be searched, in the example shown in FIG. 3A.

However, in the example, in step S115, the cost is corrected based on the weather, and the roads in the B region and the D region are higher than the roads in the A region, the C region, the E region and the F region, in the priority at the time of the route selection. As a result, the roads in the B region and the D region are more likely to be selected than the roads in the other regions. FIG. 3B shows an example in which a route shown by a solid line in FIG. 3B is searched instead of the route shown by the broken line in FIG. 3B, as a result of the priority adjustment.

After the route is searched, the control unit 20 executes the route guide, by the process of the route guide unit 21d (step S125). That is, the control unit 20 specifies the movement direction and vehicle operation that are necessary for moving the current place along the route, and outputs the control signal to the user I/F unit 45 to perform the guide about the movement direction and the operation.

(3) Other Embodiments: The above embodiment is one example for carrying out the disclosure, and various other embodiments can be employed as long as the road under the weather that the user has experienced is not excluded in the route selection. For example, the navigation system 10 may be a portable device. The navigation system 10 may be used for the guide of an object other than the vehicle, for example, for the guide of a walker. Furthermore, means for configuring the route search system may be divided to exist in a plurality of devices (for example, a client and a server). Furthermore, the route search system may be included in a device other than the navigation system 10. For example, the route search system may be included in a server that accepts the sending request for the route from the navigation system 10.

Furthermore, at least some of the estimated weather acquisition unit 21a, the experienced weather acquisition unit 21b, the route search unit 21c and the route guide unit 21d that constitute the route search system may be divided to exist in a plurality of devices. Of course, some of the constituents of the above-described embodiment may be excluded, and the order of the processes may be changed or some of the processes may be excluded. For example, the acquisition order of the estimated weather and the experienced weather may be changed. Furthermore, although the priority of the road to be selected as the route is acquired based on the cost, the preferential selection of the road may be performed by a technique other than the cost-based technique. Furthermore, regions where the current place and the destination place exist, and regions near the two places (regions within predetermined distances) cannot be excluded from the route, and therefore, the adjustment of the cost may be skipped.

The estimated weather acquisition unit only needs to be capable of acquiring the estimated weather that is estimated as the weather in the region where the candidate of the route from the departure place to the destination place exists. That is, the estimated weather acquisition unit acquires, as the estimated weather, the weather that influences the movement in the region where the route to be searched can exist. For example, it is allowable to employ a configuration of acquiring, as the estimated weather, the weather at the current time or the weather at the time point when the user arrives at the road.

The estimated weather may be specified by various techniques, and examples thereof include a configuration of acquiring the information indicating the weather in the region where the candidate of the route exists, from a management system for weather information or the like. The region where the candidate of the route exists may be specified by various techniques, and examples thereof include a region that contains the departure place, a region that contains the destination place, regions that exist between the departure place and the destination place, and regions in the periphery of each region (for example, regions that exist within a previously decided distance). The division into the regions may be decided by various techniques, and for example, may be an administrative division or may be a division (a mesh or the like) that is used in map information indicating road networks.

The departure place only needs to be a start point of the route, and the destination place only needs to be an end point of the route (a stop point in the case where there are a plurality of destination places). The route is a road along which the user moves for the arrival at the destination place from the departure place. As the aspect of the estimated weather, various aspects may be employed. For example, the estimated weather may be specified by the condition of the weather, or may be specified by the strength of the weather. As the former, there are conditions such as rainfall, snowfall, strong wind and high temperature, and as the latter, a maximum, an average, a median or the like that is estimated as an amount, strength, magnitude or the like in a previously decided period such as an hour can be employed.

The experienced weather acquisition unit only needs to be capable of acquiring the experienced weather, which is the weather that the user has experienced in the past, based on the movement history of the user. That is, in the case where the user has not experienced a certain kind of weather in the past, there is a high possibility that the user wishes to avoid the movement under the certain kind of weather. In the case where the user has experienced the certain kind of weather, the user may not wish to avoid the movement under the certain kind of weather. Hence, there is a high possibility that it is possible to specify the weather that the user wishes to avoid by acquiring the experienced weather, which is the weather that the user has experienced in the past.

As the aspect of the experienced weather, various aspects can be employed. For example, the experienced weather may be specified by the condition of the weather, or may be specified by the strength of the weather. As the former, there are conditions such as rainfall, snowfall, strong wind and high temperature, and as the latter, a maximum, an average, a median or the like that is estimated as an amount, strength, magnitude or the like in a previously decided period such as an hour can be employed. The experienced weather may be specified by various techniques, and for example, it is allowable to employ a configuration in which the experienced weather is specified based on the movement history of the user, is stored in a recording medium included in an external device or the navigation system 10, and is acquired as necessary.

The route search unit only needs to be capable of searching the route by preferentially selecting the road in the region where the estimated weather coincides with the experienced weather over the road in the region where the estimated weather does not coincide with the experienced weather. That is, the route search unit only needs to be capable of searching the route from the departure place to the destination place, and on this occasion, adjusting whether each road constituting a route is likely to be selected as the route depending on the experience of the user for the weather in a region where the road can exist.

Accordingly, the region to which each road belongs is previously defined, and when the weather in each region is specified, the weather at each road belonging to the region is specified. Therefore, when the estimated weather and the experienced weather are compared for each region, it is possible to specify whether each road should be preferentially selected as the route. Here, the route may be specified by various other elements, and for example, a road allowing the shortening of route distance, travel time or the like may be preferentially selected.

As the technique for specifying the route by a plurality of elements in this way, for example, there is a technique of specifying the cost for each road section and searching a route that minimizes costs. Of course, various adjustments may be performed to the cost (the adjustment may be performed in accordance with a decided rule, for example, by giving priority to distance or by giving priority to toll roads). In the case where the route is searched based on a plurality of elements and where the elements other than weather are fixed, the road in the region where the estimated weather coincides with the experienced weather may be preferentially selected over the road in the region where the estimated weather does not coincide with the experienced weather.

The degree of the coincidence between the estimated weather and the experienced weather may be determined by various techniques. That is, since the weather can be specified by the condition of the weather, the strength of the weather or the like, the degree of the coincidence may be determined by techniques corresponding to various specification aspects. For example, in the case where the weather is defined by the condition such as rainfall or snowfall, it is allowable to employ a configuration in which whether the estimated weather coincides with the experienced weather is determined based on the coincidence of the condition. In the case where the weather is defined by the strength such as rainfall amount or snowfall amount, it is allowable to employ a configuration in which whether the estimated weather coincides with the experienced weather is determined by a determination technique, for example, by whether the difference in the strength is within a threshold or by whether the level of the strength is an identical level.

When the road is preferentially selected as the route, the road may be preferentially selected depending on whether the user has experienced, or the degree to which the road is preferentially selected may be decided depending on the degree of the experience. Examples of the latter include a configuration in which the route search unit increases the priority when the road in the region under the experienced weather is selected as the route, as the amount of experience of the user for the experienced weather becomes larger.

That is, it is presumable that the user is more accustomed to the movement under the experienced weather as the amount of experience of the user for the experienced weather becomes larger. Hence, by adopting a configuration of increasing the priority when the road in the region under the experienced weather is selected as the route as the amount of experience for the experienced weather becomes larger, the road under the weather to which the user is accustomed is likely to be selected. Here, the priority may be decided in accordance with a previously decided rule, and may be changed in a continuous manner or may be changed in a stepwise manner.

Furthermore, the amount of experience of the user can be evaluated by various techniques. For example, the route search unit may be configured to increase the priority as at least one of the number of times by which the user has experienced the experienced weather and the distance by which the user has moved on the road under the experienced weather becomes larger. That is, the amount of experience may be regarded as being larger as the number of times by which the user has experienced the experienced weather becomes larger, or the amount of experience may be regarded as being larger as the distance by which the user has moved on the road under the experienced weather becomes larger. The amount of experience may be evaluated by the combination of the two. According to this configuration, it is possible to objectively evaluate the amount of experience, and to change the priority depending on the amount of experience.

Furthermore, it is allowable to employ a configuration of including the route guide unit that performs the guide about the route. That is, by the guide about the searched route, the guided user can move along the route. Of course, as the aspect of the guide about the route, various aspects may be employed. For example, the road sections on the route may be displayed on a map, so as to be distinguished from the other road sections, and a guide for leading the user such that the current place moves on the route may be output.

Furthermore, in the configuration of performing the guide about the route, when there is a difference between the route searched by the route search unit and the route searched without the preferential selection of the road based on the estimated weather and the experienced weather, the route guide unit may perform guide about a different part. That is, in the case of performing the route search with the preferential selection of the road based on the estimated weather and the experienced weather and the route search (the route search in the related art) without the preferential selection of the road based on the estimated weather and the experienced weather, a different part can be produced.

In this case, by the guide about the different part, in the case of employing the route search with the preferential selection of the road based on the estimated weather and the experienced weather, the user can recognize a part that would not be on the route in ordinary circumstances (a part that is selected due to a detour). In the example shown in FIG. 3B, it is assumed that the control unit 20 searches the route shown by the broken line in FIG. 3A by performing the route search using the default value of the cost. In the example, the control unit 20 acquires the difference between the route shown by the broken line in FIG. 3A and the route shown by the solid line in FIG. 3B. Then, the control unit 20 outputs a control signal to the user I/F unit 45, and highlights a different part between the two, on the route shown by the solid line in FIG. 3B. Thereby, the user can recognize the part on the route that is selected due to the detour.

Furthermore, the technique by which the road under the weather that the user has experienced is not excluded in the route selection as described above can be applied also as a program or a method. Further, the above system, method or program can be realized by a single device or can be realized by a plurality of devices, and includes various aspects. For example, a navigation system, method or program including the above-described means can be provided. Further, when appropriate, modifications can be made. For example, a part may be implemented in software, and a part may be implemented in hardware. Furthermore, the disclosure is satisfied also as a recording medium for the program that controls the system. Of course, the software recording medium may be a magnetic recording medium, or may be a magneto-optical recording medium. The same goes for any recording medium that will be developed in the future.

What is claimed is:

1. A route search system comprising an electronic control unit configured to perform:

acquiring estimated weather information, the estimated weather information being information about weather that is estimated in a region where a candidate of a first route from a departure place to a destination place exists;

acquiring experienced weather information, the experienced weather information being information about weather that a user has experienced in past;

searching the first route by preferentially selecting a first road over a second road, and outputting information about the first route, the first road being a road in a first region where the estimated weather information coincides with the experienced weather information, the second road being a road in a second region where the estimated weather information does not coincide with the experienced weather information;
performing guidance for the user with a user interface based on information output by the electronic control unit, wherein the electronic control unit searches a second route from the departure place to the destination place, the second route being searched without the preferential selection associated with coincidence between the estimated weather information and the experienced weather information; extracts a difference between the first route and the second route; and instructs the user interface to perform guidance about the difference;
determine, for each region where the candidate of the first route exists, whether the estimated weather coincides with the experienced weather;
search the first route with the electronic control unit while adjusting a first correction factor such that the first correction factor becomes smaller than a second correction factor, a cost of the first route being multiplied by the first correction factor, and a cost of the second route being multiplied by the second correction factor; and
when the first route is searched, the electronic control unit is configured to skip adjusting a correction factor for a cost of a road in a region where the destination place exists.

2. The route search system according to claim 1, wherein a third road is preferentially selected over a fourth road, the third road being a road in a third region where the estimated weather information coincides with the experienced weather information with a large amount of experience of the user, the fourth road being a road in a fourth region where the estimated weather information coincides with the experienced weather information with a small amount of experience of the user.

3. The route search system according to claim 1, wherein the experienced weather information includes at least one of first information about the number of times by which the user has experienced a predetermined kind of weather and second information about a distance by which the user has moved on a road under the predetermined kind of weather, and a third road is preferentially selected over a fourth road, the third road being a road in a third region where weather with a large number of times in the first information or weather with a long distance in the second information is estimated, the fourth road being a road in a fourth region where weather with a small number of times in the first information or weather with a short distance in the second information is estimated.

4. A non-transitory computer readable medium that stores a route search program, the route search program configured to cause a computer to function to:
acquire estimated weather information, the estimated weather information being information about weather that is estimated in a region where a candidate of a first route from a departure place to a destination place exists;
acquire experienced weather information based on a movement history of a user, the experienced weather information being information about weather that the user has experienced in past;
search the first route by preferentially selecting a road in the region where the estimated weather information coincides with the experienced weather information over a road in the region where the estimated weather information does not coincide with the experienced weather information;
performing guidance for the user with a user interface based on information output by the electronic control unit, wherein the electronic control unit searches a second route from the departure place to the destination place, the second route being searched without the preferential selection associated with coincidence between the estimated weather information and the experienced weather information; extracts a difference between the first route and the second route; and instructs the user interface to perform guidance about the difference;
determine, for each region where the candidate of the first route exists, whether the estimated weather coincides with the experienced weather;
search the first route with the electronic control unit while adjusting a first correction factor such that the first correction factor becomes smaller than a second correction factor, a cost of the first route being multiplied by the first correction factor, and a cost of the second route being multiplied by the second correction factor; and
when the first route is searched, the electronic control unit is configured to skip adjusting a correction factor for a cost of a road in a region where the destination place exists.

5. A route search system comprising:
an estimated weather acquisition unit that acquires estimated weather, the estimated weather being weather that is estimated in a region where a candidate of a route from a departure place to a destination place exists;
an experienced weather acquisition unit that acquires experienced weather based on a movement history of a user, the experienced weather being weather that the user has experienced in past;
a route search unit that searches the route by preferentially selecting a road in the region where the estimated weather coincides with the experienced weather over a road in the region where the estimated weather does not coincide with the experienced weather;
performing guidance for the user with a user interface based on information output by the electronic control unit, wherein the electronic control unit searches a second route from the departure place to the destination place, the second route being searched without the preferential selection associated with coincidence between the estimated weather information and the experienced weather information; extracts a difference between the first route and the second route; and instructs the user interface to perform guidance about the difference;
determine, for each region where the candidate of the route exists, whether the estimated weather coincides with the experienced weather;
search the first route with the electronic control unit while adjusting a first correction factor such that the first correction factor becomes smaller than a second correction factor, a cost of the first route being multiplied by the first correction factor, and a cost of the second route being multiplied by the second correction factor; and when the first route is searched, the electronic control unit is configured to skip adjusting a correction factor for a cost of a road in a region where the destination place exists.

6. The route search system according to claim 5, wherein the route search unit increases a priority when a road in the region under the experienced weather is selected as the route, as an amount of experience of the user for the experienced weather becomes larger.

7. The route search system according to claim 6, wherein the route search unit increases the priority, as at least one of the number of times by which the user has experienced the experienced weather and a distance by which the user has moved on a road under the experienced weather becomes larger.

8. The route search system according to claim 5, further comprising a route guide unit that performs guidance about the route, wherein when there is a difference between the route searched by the route search unit and the route searched without the preferential selection of the road based on the estimated weather and the experienced weather, the route guide unit performs guidance about a different road.

9. A route search system comprising an electronic control unit configured to perform:
   acquiring estimated weather information, the estimated weather information being information about weather that is estimated in a region where a candidate of a first route from a departure place to a destination place exists;
   acquiring experienced weather information, the experienced weather information being information about weather that a user has experienced in past;
   searching the first route by preferentially selecting a first road over a second road, and outputting information about the first route, the first road being a road in a first region where the estimated weather information includes the experienced weather information, the second road being a road in a second region where the estimated weather information does not includes the experienced weather information;
   performing guidance for the user with a user interface based on information output by the electronic control unit, wherein the electronic control unit searches a second route from the departure place to the destination place, the second route being searched without the preferential selection associated with coincidence between the estimated weather information and the experienced weather information; extracts a difference between the first route and the second route; and instructs the user interface to perform guidance about the difference;
   determine, for each region where the candidate of the first route exists, whether the estimated weather coincides with the experienced weather;
   search the first route with the electronic control unit while adjusting a first correction factor such that the first correction factor becomes smaller than a second correction factor, a cost of the first route being multiplied by the first correction factor, and a cost of the second route being multiplied by the second correction factor; and
   when the first route is searched, the electronic control unit is configured to skip adjusting a correction factor for a cost of a road in a region where the destination place exists.

* * * * *